(12) United States Patent
Kim et al.

(10) Patent No.: US 6,859,576 B2
(45) Date of Patent: Feb. 22, 2005

(54) OPTICAL CROSS-CONNECT SYSTEM

(75) Inventors: Jong-Kwon Kim, Taejonkwangyok-shi (KR); Yun-Je Oh, Yongin-shi (KR); Seong-Taek Hwang, Pyongtaek-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 10/443,181

(22) Filed: May 22, 2003

(65) Prior Publication Data

US 2004/0067011 A1 Apr. 8, 2004

(30) Foreign Application Priority Data

Oct. 7, 2002 (KR) ................................ 10-2002-0061010

(51) Int. Cl.$^7$ ................................................. G02B 6/26
(52) U.S. Cl. ..................... 385/17; 359/107; 359/108; 398/43; 398/45
(58) Field of Search ................... 385/16, 17, 20, 385/21, 22, 23

(56) References Cited

U.S. PATENT DOCUMENTS 5,909,298 A * 6/1999 Shimada et al. ............ 398/164
6,377,373 B1 * 4/2002 Kawazawa et al. ........... 398/82
2002/0080446 A1 * 6/2002 Derventzis et al. ......... 359/128

* cited by examiner

Primary Examiner—Phan T. H. Palmer
Assistant Examiner—Jennifer Doan
(74) Attorney, Agent, or Firm—Cha & Reiter, L.L.C.

(57) ABSTRACT

An optical cross-connect system is disclosed that use reduces the number of AWGs (Arrayed-Waveguide Grating) as compared to prior art systems so that the hardware complexity is reduced while simultaneously reducing its production costs. The optical cross-connect system includes N×N AWGs for performing multiplexing/demultiplexing functions, an optical circulator for transmitting bidirectional signals via the AWGs, an optical coupler for interconnecting N individual ports of the AWGs, and an optical switching block connected to the optical coupler. One of the optical signals branched from the optical coupler is input to the optical switching block having a corresponding wavelength and distributed to a desired output terminal, and the other one of the optical signals is input to an optical switching block being out of an operable wavelength range and filtered by the optical switching block.

7 Claims, 4 Drawing Sheets

OPTICAL CROSS-CONNECT SYSTEM

CLAIM OF PRIORITY

This application claims priority to an application entitled "OPTICAL CROSS-CONNECT SYSTEM," filed in the Korean Intellectual Property Office on Oct. 7, 2002 and assigned Serial No. 2002-61010, the contents of which are hereby incorporated by reference.

BACKGROUND OF THE INVENTION

1. Field of the Invention

The present invention relates to an optical communication system, and more particularly to an optical cross-connect system for demultiplexing/switching wavelength-division-multiplexed optical signal channels received via input optical fibers, performing a wavelength division multiplexing on the optical signal channels, and then outputting the resultant signal to output optical fibers.

2. Description of the Related Art

Following the current trend of rapidly growing wavelength division multiplexing techniques using several wavelengths within one optical fiber, it is possible for one optical fiber to transmit a plurality of very high-speed mass storage optical signals. Conventional techniques for fabricating optical components generally use a path setup function, a distribution function (i.e., a switching function) and an add/drop function (i.e., a coupling function) of optical signals that is performed in an optical layer. Given these conventional techniques, an optical communication network on the basis of such wavelength division multiplexing (WDM) techniques can be constructed.

A wavelength division multiplexing (WDM) optical communication network is typically constructed as a mesh-structure network using an optical cross-connect system. The optical cross-connect system that distributes optical signals according to their wavelengths can be adopted for nodes of such optical communication networks. Optical paths for such optical communication networks are determined by a signal distribution state of the optical cross-connect system. In this case, it is necessary to develop simple and economical optical cross-connect systems to manage efficiently and economically the WDM optical communication network. For definitional purposes, the term 'distribution' is used as a generic term encompassing both a routing concept and a switching concept.

FIG. 1 is a diagram illustrating a conventional 2×2 optical cross-connect system.

In FIG. 1, a conventional 2×2 optical cross-connect system 100 have two input terminals and two output terminals includes two 1×N wavelength division demultiplexers 110. The demultiplexers 110 demultiplex optical signals, where a plurality of wavelengths λ1, λ2, λ3, . . . , λN, received via the input terminals are wavelength-division-multiplexed. The system 100 also includes N optical switches 120 that receive the same wavelengths of signals from the two wavelength division demultiplexers. The optical switches 120 perform a distribution function for distributing the received signals to a desired output port. The output ports provide the signals to two N×1 wavelength division multiplexers 130 that multiplex signals received from the optical switches 120.

In 2×2 optical cross-connect system 100, the wavelength division demultiplexers 110 classify a plurality of multiplexed optical signals received from input terminals according to their wavelengths, and output the classified signals to an appropriate optical switch 120 corresponding to each wavelength. Each of the optical switches 120 receives optical signals of a specified wavelength related to its own operable range from the wavelength division demultiplexers 110. The optical switches 120 then perform an add/drop operation (i.e., a coupling operation) on the optical signals or passes the optical signals. The resulting signals are distributed to the output ports. Each of the wavelength division multiplexer 130 receives optical signals having different wavelengths from the optical switches 120, wavelength-division-multiplexes the optical signals, and then outputs them via the output terminals.

Arrayed-waveguide gratings (AWGs) are typically used as a multiplexer and a demultiplexer, because they have easily extensible optical signal channels, are simply controlled, and have superior degrees of integration. In case of implementing a conventional 2×2 optical cross-connect system, four 1×N AWGs are needed. As can be seen from FIG. 1, the four 1×N AWGs should be controlled to have the same operational characteristics because 2N wavelengths in total are normally multiplexed and demultiplexed.

Likewise, in the case where N optical signals are transmitted on one fiber, 2M 1×N-AWGs are needed to control an optical cross-connect system having N input optical fibers and N output optical fibers, and N M×M optical switches are also needed. In this case, 2M 1×N-AWGs should be controlled to have the same wavelength transmission characteristics. As will be appreciated, such conventional optical cross-connect systems are complex and incur high production costs due to many requisite components.

Accordingly, there is a need in the art for improved optical cross-connect systems that use fewer AWG and thereby reducing cost and complexity of the systems.

SUMMARY OF THE INVENTION

One aspect of the present invention is to provide an optical cross-connect system using a minimum number of AWGs so that its hardware complexity is reduced while simultaneously with reducing its production costs.

In accordance with one embodiment of the present invention, the above and other objects can be accomplished by an optical cross-connect system including M (where M is an even number ≧2) input terminals receiving wavelength-division-multiplexed optical signals and M output terminals receiving wavelength-division-multiplexed optical signals. The optical cross-connect system includes a plurality of wavelength division multiplexers/demultiplexers, each having two one-side ports and N (where N is an integer >0) other-side ports, performing wavelength division multiplexing/demultiplexing functions. The system also includes a plurality of optical circulators, each connected to one-side port of the wavelength division multiplexers/demultiplexers, that output wavelength-division-multiplexed optical signals received via the input terminals to one-side ports of the wavelength division multiplexers/demultiplexers, receive wavelength-division-multiplexed optical signals from one-side ports of the wavelength division multiplexers/demultiplexers, and output the wavelength-division-multiplexed optical signals to the output terminals. The system further includes a plurality of optical couplers, each connected to N other ports of the wavelength division multiplexers/demultiplexers, that branch optical signals of individual wavelengths being wavelength-division-demultiplexed. The optical signals are received from the wavelength division multiplexers/ demultiplexers. In addition, the system includes N optical switching blocks for N wavelengths that receiving optical signals branched from the optical couplers according to their wavelengths, switch the optical signals to a desired path, and transmit the switched optical signals to the desired path. One of the optical signals branched from the optical coupler is input to the optical switching block having a corresponding wavelength and distributed to a desired output terminal, and the other one of the optical signals is input to an optical switching block being out of an operable wavelength range and filtered by the optical switching block.

Preferably, the N optical switching blocks for N wavelengths may respectively include: an optical switch having an M×M matrix structure; and a plurality of optical circulators each connected to M input terminals and M output terminals of the optical switch, for transmitting I/O (Input/Output) bidirectional signals to the optical switch.

Preferably, the N optical switching blocks for N wavelengths may respectively include: an optical switch having an M×M matrix structure; and a plurality of optical circulators each connected to M input terminals and M output terminals of the optical switch, for transmitting I/O (Input/Output) bidirectional signals to the optical switch.

BRIEF DESCRIPTION OF THE DRAWINGS

The above advantages of the present invention will be more clearly understood from the following detailed description taken in conjunction with the accompanying drawings, in which.

DETAILED DESCRIPTION OF THE PREFERRED EMBODIMENTS

Figure 1:
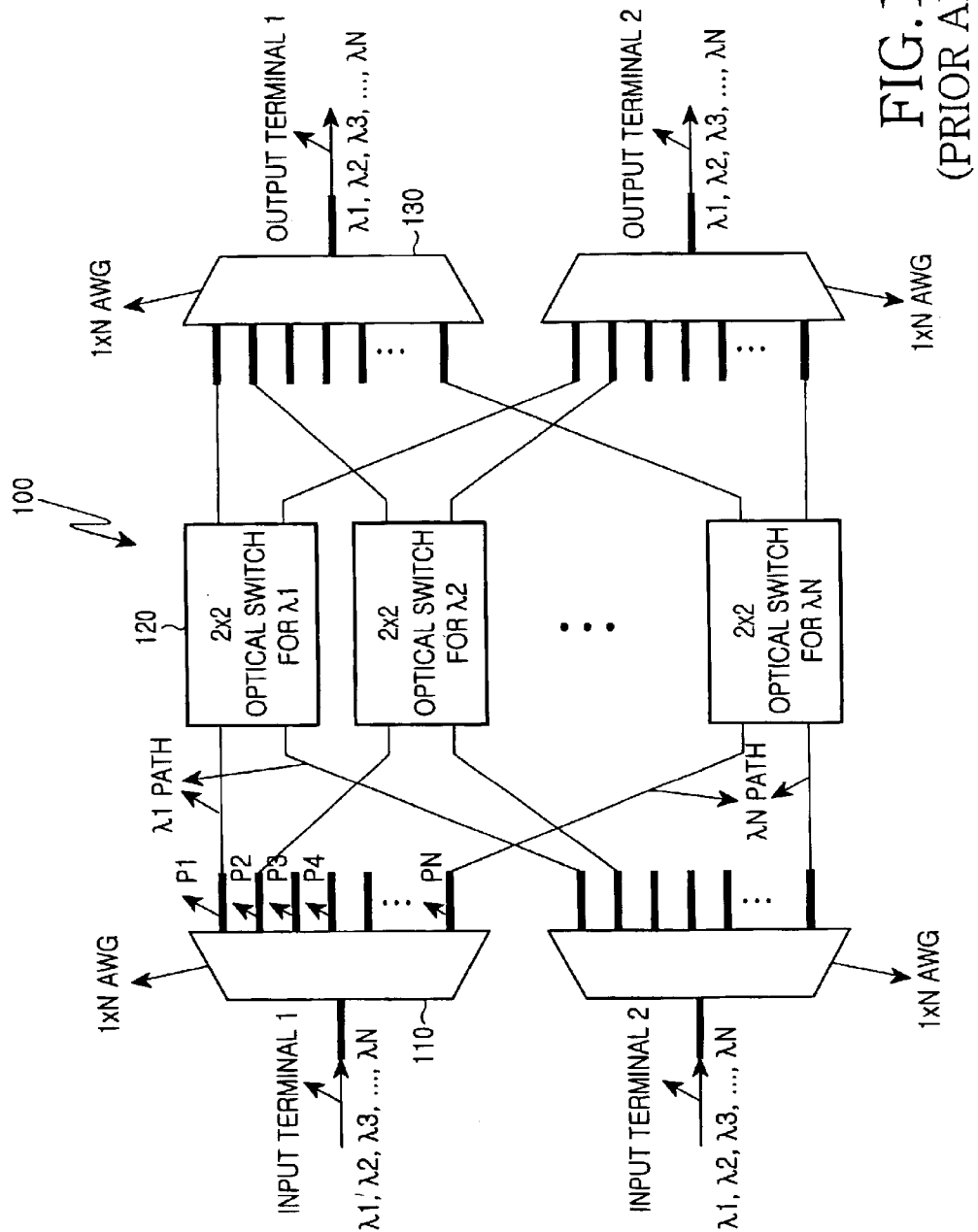
FIG. 1 is a diagram illustrating a conventional 2×2 optical cross-connect system.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention rather unclear.

Figure 2:
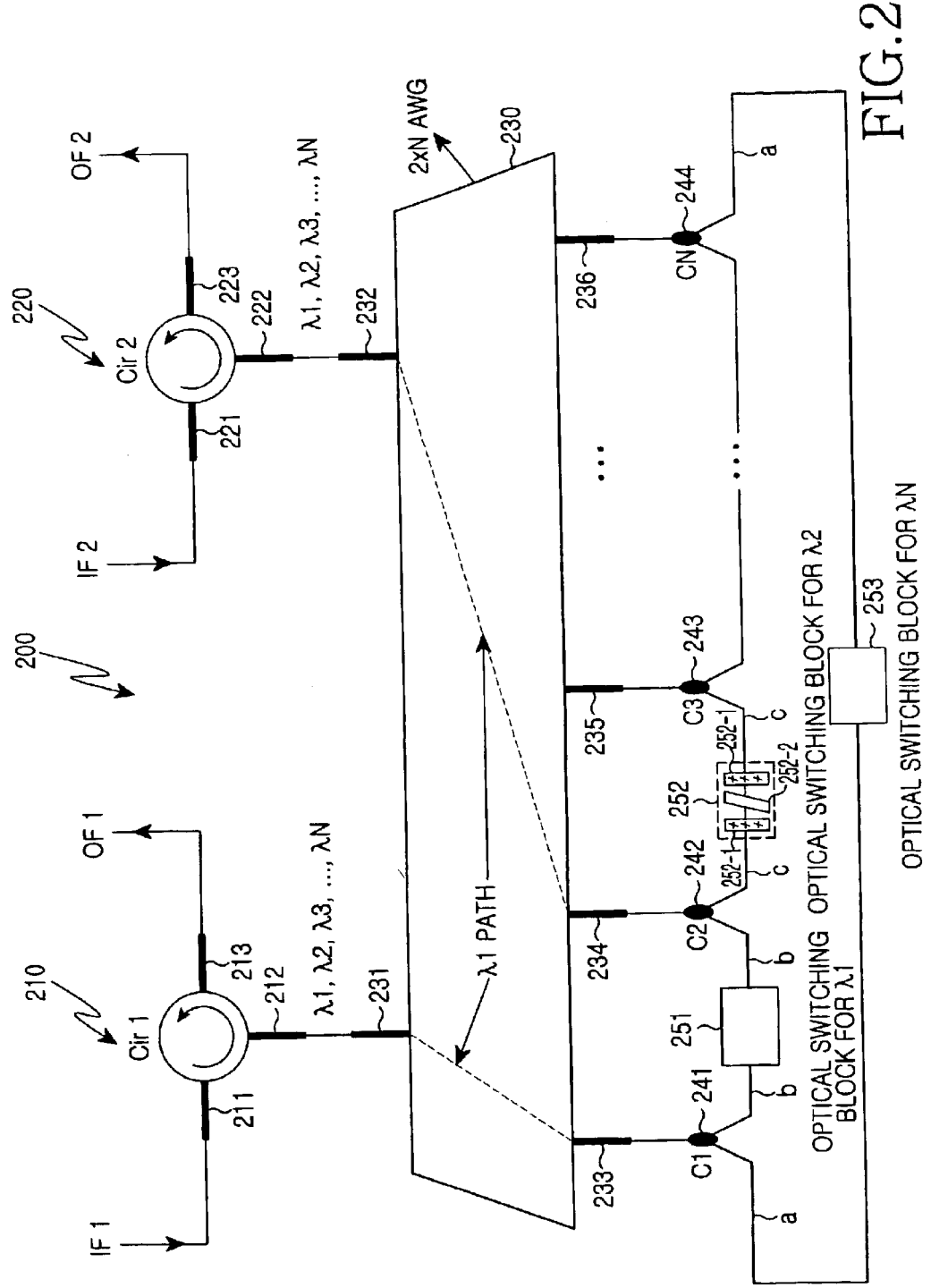
FIG. 2 is a detailed diagram of a 2×2 optical cross-connect system in accordance with a preferred embodiment of the present invention.

FIG. 2 is a detailed diagram of a 2×2 optical cross-connect system 200 in accordance with a preferred embodiment of the present invention.

The 2×2 optical cross-connect system 200 have two input terminals and two output terminals. The 2×2 optical cross-connect system 200 also includes two optical circulators 210 and 220, a single 2×N multiplexer/demultiplexer 230, N couplers 241, 242, 243 and 244, and N optical switching blocks 251, 252 and 253.

The two optical circulators 210 and 220 each have three terminals. The optical circulators 210 and 220 are adapted to designate optical paths of optical signals and to handle bidirectional signals that are input and output. The first and second optical circulators 210 and 220 respectively receive an N-wavelength division-multiplexed optical signal via first terminals 211 and 221. The first and second optical circulators 210 and 220 may respectively output the received optical signal to first and second multiplexing ports 231 and 232 of the wavelength division multiplexer/demultiplexer 230, or may respectively transmit the N-wavelength division-multiplexed optical signal received from the wavelength division multiplexer/demultiplexer 230 to third terminals 213 and 223 via the second terminals 212 and 222.

The 2×N wavelength multiplexer/demultiplexer 230 is fabricated as an AWG having two multiplexing ports (231 and 232) and N demultiplexing ports (233 through 236). The 2×N wavelength multiplexer/demultiplexer 230 demultiplexes N-wavelength division-multiplexed optical signals received at the multiplexing ports 231 and 232 and then outputs the demultiplexed optical signals to the N demultiplexing ports 233, 234, 235 and 236. The 2×N wavelength multiplexer/demultiplexer 230 functions as a wavelength division demultiplexer. The 2×N wavelength multiplexer/demultiplexer 230 also multiplexes optical signals of individual wavelengths received at the N demultiplexing ports 233, 234, 235 and 236, and outputs the multiplexed optical signals to the multiplexing ports 231 and 232 each connected to the second terminals 212 and 222 of the first and second optical circulators 210 and 220. In this regard, the 2×N wavelength multiplexer/demultiplexer 230 functions as a wavelength division multiplexer.

The N 1×2-couplers 241, 242, 243 and 244 are respectively connected to, and interconnect, the N demultiplexing ports 233, 234, 235 and 236 of the 2×N wavelength division multiplexer/demultiplexer 230 The N 1×2-couplers 241, 242, 243 and 244 also branch the optical signals of individual wavelengths received from the demultiplexing ports 233~236 and transmit the branched optical signals to one side port of adjacent couplers. For this operation, the N couplers 241~244 are respectively branched into two ports a~b, and share the ports a~b with their adjacent couplers.

The N optical switching blocks 251, 252 and 253 are arranged between the branched ports of the N couplers 241, 242, 243 and 244. The N optical switching blocks 251, 252 and 253 are adapted to pass two signals of individual wavelengths in a signal traveling direction or reflect the two signals in the opposite direction of each signal traveling direction. The optical switching blocks 251, 252 and 253 respectively include a pair of wideband pass filters 252-1 and an optical mirror 252-2. The wideband pass filters 252-1 are connected to each port of the N couplers 241, 242, 243 and 244, and pass optical signals of individual wavelengths. The optical mirror 252-2 is arranged between one pair of wideband pass filters 252-1, and either passes two signals of individual wavelengths in a signal traveling direction or reflects the two signals in the opposite direction of each signal traveling direction. Also, the optical switching blocks 251, 252 and 243 may respectively include a Bragg grating that reflects optical signals of individual wavelengths.

In operation, the 2×2 optical cross-connect system 200 receives an N-wavelength division-multiplexed optical signal at the first terminal 211 of the first optical circulator 210. This optical signal is transmitted to the first multiplexing port 231 of 2×N multiplexer/demultiplexer 230 via the second terminal 212, and is wavelength-division-demultiplexed. The resulting optical signal is then transmitted to the individual ports 233, 234, 235 and 236.

Hereinafter, for the convenience of the description, an optical signal $\lambda 1$ from the second terminal 212 will only be described below. After being multiplexed and transmitted to the individual port 233, the optical signal λ1 becomes two sub-optical signals by splitting its power via the coupler 241. The split signals are then transmitted to adjacent ports a~b. One of the sub-optical signals is transmitted to a second multiplexing port and to adjacent coupler 242 via an optical switching block 251. This sub-optical signal is then is transmitted to the individual port 234 of the 2×N multiplexer/demultiplexer 230 connected to the coupler 242. The sub-optical signal is then wavelength-division-multiplexed, and finally it is transmitted to the second multiplexing port 232 of the 2×N multiplexer/demultiplexer 230. The resulting multiplexed optical signals are transmitted to the third terminal 223 via the second terminal 222 of the second optical circulator 220.

The other sub-optical signal passes an optical switching block 253 and is transmitted to the individual port 236 of the wavelength division multiplexer/demultiplexer 230 via the coupler 244. However, it is cut off because the individual port 236 is not a port for passing the optical signal λ1.

In this way, an N-wavelength division-multiplexed optical signal received at the first terminal 221 of the second optical circulator 220 is transmitted to the second multiplexing port 232 of 2×N multiplxer/demultiplexer 230 via the second terminal 212, and is wavelength-division-demultiplexed and then transmitted to the individual ports 233, 234, 235 and 236.

Considering only the optical signal λ1 from the second terminal 222 for the convenience, the optical signal λ1 is multiplexed and transmitted to the individual port 234 and becomes two sub-optical signals by splitting its power via the coupler 242, and is then transmitted to adjacent ports b~c. One of the sub-optical signal is transmitted to a first multiplexing port is transmitted to the adjacent coupler 241 via the optical switching block 251. This sub-optical signal is then transmitted to the individual port 233 of the 2×N multiplexer/demultiplexer 230 connected to the coupler 241, is wavelength-division-multiplexed. The sub-optical signal is finally transmitted to the first multiplexing port 231 of the 2×N multiplexer/demultiplexer 230. The resulting multiplexed optical signals are transmitted to the third terminal 213 via the second terminal 212 of the second optical circulator 220.

The other sub-optical signal passes the optical switching block 252 and is transmitted to the individual port 235 of the wavelength division multiplexer/demultiplexer 230 via the adjacent coupler 243. However, it is cut off because the individual port 235 is not a port for passing the optical signal λ1.

Figure 3:
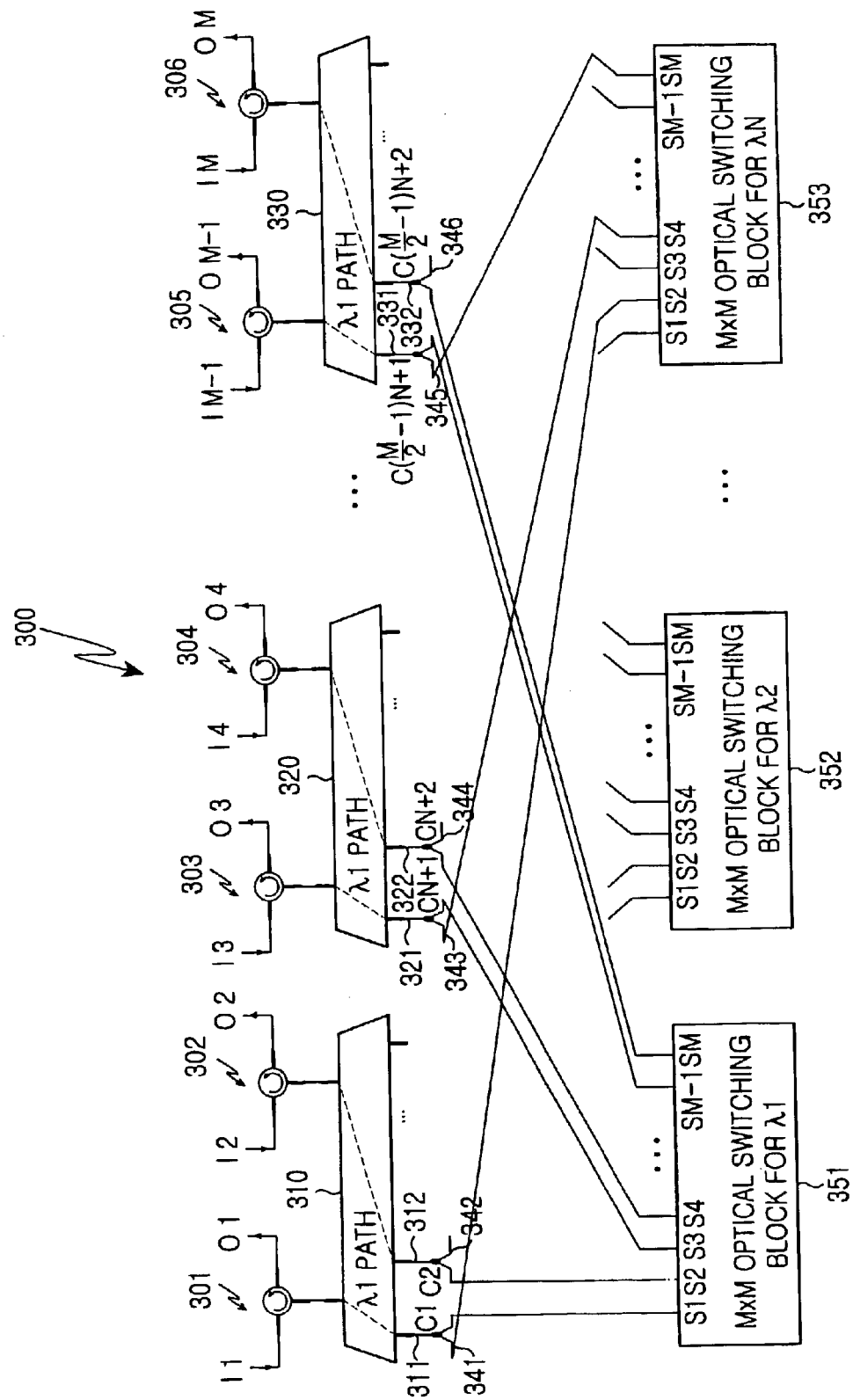
FIG. 3 is a detailed diagram of an M×M optical cross-connect system in accordance with a preferred embodiment of the present invention.

FIG. 3 is a detailed diagram of an M×M optical cross-connect system 300 in accordance with another embodiment of the present invention. This diagram illustrates a system configuration for extending the 2×2 optical cross-connect system 200 having two input terminals and two output terminals as shown in FIG. 2 to an M×M optical cross-connect system having M input terminals and M output terminals. For reference, it should be noted that FIG. 3 depicts only a path of an optical signal λ1.

Referring to both FIGS. 2 and 3, the M×M optical cross-connect system 300 includes M/2 2×2 optical cross-connect systems (shown in FIG. 2) each having two optical circulators 210 and 220, one 2×N multiplexer/demultiplexer 230, N couplers 241~244, and N optical switching blocks 251~253. In this case, the optical switching blocks are include of N M×M optical switching blocks 351, 352 and 353 in such a way that they respectively contain M wavelength-division-multiplexed input optical signals wherein N wavelengths are division-multiplexed.

The operation of an N×N optical cross-connect system in accordance with one embodiment of the present invention will hereinafter be described with reference to FIG. 3.

The optical circulators 301, 302, 303, 304, 305, and 306 transmit N-wavelength division-multiplexed optical signals received at their first terminals to the wavelength division multiplexers/demultiplexers 310, 320 and 330 connected to their second terminals.

The wavelength division multiplexers/demultiplexers 310, 320 and 330 separate each signal corresponding to each wavelength from the N-wavelength division-multiplexed optical signal transmitted from the optical circulators 301, 302, 303, 304, 305 and 306, and output the separated signals to 1×2 couplers 311, 312, 321, 322, 331 and 332 connected to N individual ports.

The 1×2 couplers 311, 312, 321, 322, 331 and 332 branch the optical signals of individual wavelengths received from the wavelength division multiplexers/demultiplexers 310, 320 and 330, and output the branched optical signals to optical switching blocks 351, 352 and 353 having individual wavelengths.

Each of the optical switching blocks 351, 352 and 353 receives optical signals of a specified wavelength related to its own operable range from the couplers 311, 312, 321, 322, 331 and 332, and then distributes the result signals to desired output terminals. For this operation, in accordance with another embodiment of the present invention, each of the optical switching blocks 351, 352 and 353 are constructed as shown in FIG. 4.

Figure 4:
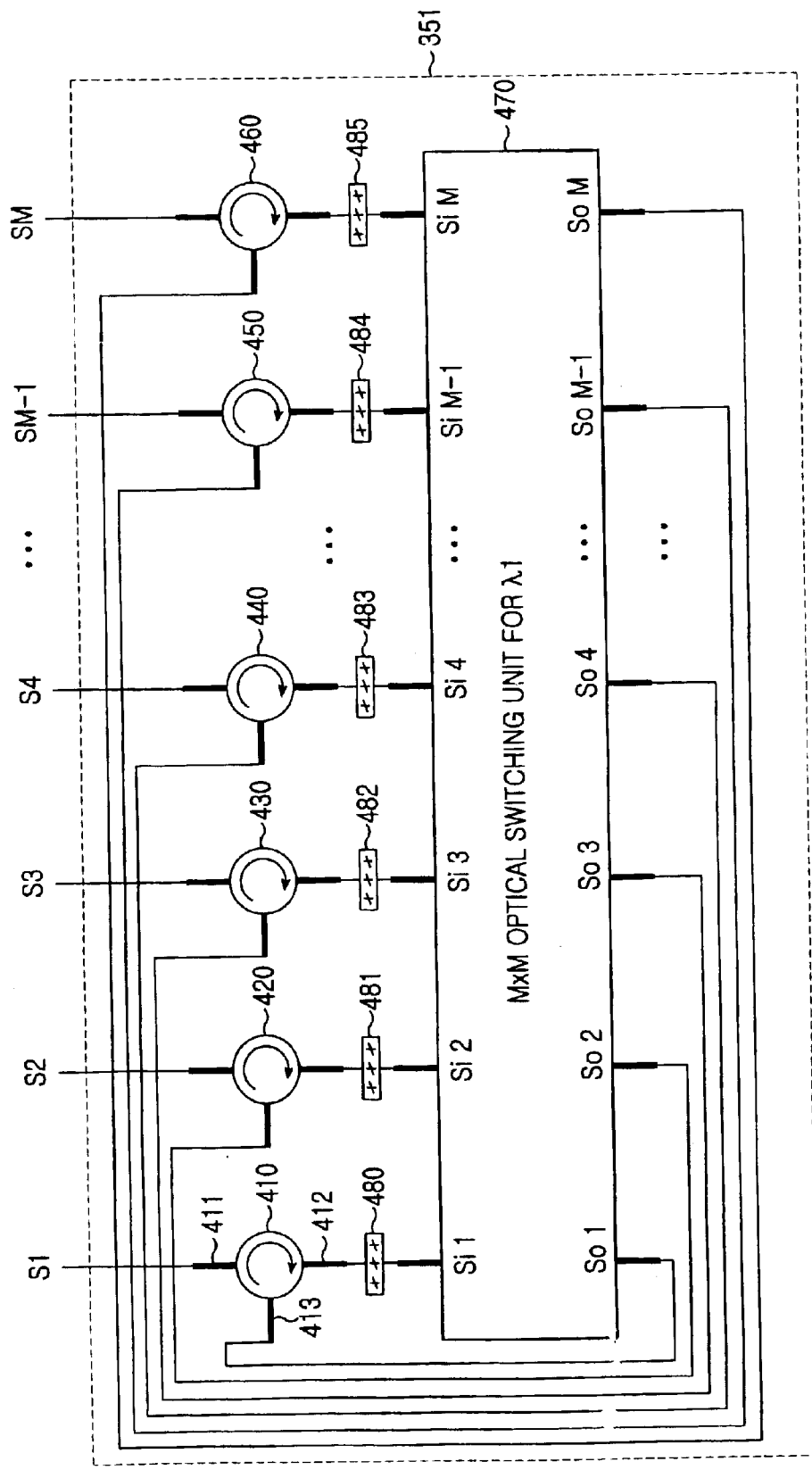
FIG. 4 is a detailed diagram of an M×M optical switching block in accordance with a preferred embodiment of the present invention.

FIG. 4 is a detailed diagram of an M×M optical switching block for extending optical cross-connect systems. For the convenience of description, FIG. 4 illustrates only an optical switching block for an optical signal λ1 in detail.

Referring to FIG. 4, the M×M optical switching block 351 for the optical signal λ1 includes one M×M optical switch 470, a plurality of wideband pass filters 480, 481, 482, 483, 484 and 485 respectively connected to input ports Si1~SiM, and M 3-terminal optical circulators 410~460 respectively connected to output ports So1~SoM of the M×M optical switch 470. In this case, the M×M optical switching block 351 contains M ports S1~SM. The ports S1~SM are respectively connected to the optical circulators 410~460 to manage two-way signals which are input and output.

The 3-terminal optical circulators 410~460 receive the same wavelength optical signals transmitted at the M ports S1~SM of the M×M optical switching block 351 via their first terminals (e.g., 411), and respectively output the received optical signals to the input ports Si1~SiM of the M×M optical switch 470 via the wideband pass filters 480~485 connected to their second terminals (e.g., 412). In addition, the 3-terminal optical circulators 410~460 receive optical signals generated from the output ports So1~SoM at their third terminals (e.g., 413), and output the received optical signals to the ports S1~SM of the M×M optical switching block 351 connected to their first terminals. This operation is called a two-way signal transmission function. In this case, the wideband pass filter 480–485 are adapted to prevent noise in optical signals received at M input terminals of the optical switch, using an optical circulator.

The M×M optical switch 470 receives the same wavelength optical signals at its own input ports Si1~SiM via the wideband pass filters 480–485 each connected to second terminals of the optical circulators 410~460, distributes the received optical signals to desired output terminals, and then outputs the result signals to third terminals of optical circulators connected to the output ports So1~SoM of the optical switch 470.

The operations of the aforementioned N×N optical cross-connect system will hereinafter be described with reference to a path of an optical signal λ1.

Referring to both FIGS. 3 and 4, M wavelength-division-multiplexed optical signals, where N wavelengths are division-multiplexed, are received at first terminals I1~IM of the optical circulators 301, 302, 303, 304, 305, and 306 and are transmitted to the wavelength division multiplexers/demultiplexers 310, 320 and 330 via second terminals of the optical circulators 301~306. The optical signals are then divided into signals of individual wavelengths by the wavelength division multiplexers/demultiplexers 310~330, and are transmitted to 1×2 couplers 311, 312, 321, 322, 331 and 332 connected to N individual ports.

The optical signal λ1 is divided into two sub-optical signals by the C1 coupler 341, the CN+1 coupler 343 and the C(M/2−1)+1 coupler 345. One of the sub-optical signals is transmitted to the M×M optical switching block 351 for λ1, and the other sub-optical signal is transmitted to an M×M optical switching block 353 for λN. The optical signals λ1 transmitted to the M×M optical switching block 353 for λN is cut off because it is out of an operable range of the optical switching block 353. On the other hand, the optical signal λ1 transmitted to each individual port S1~SM of the M×M optical switching block 351 for λ1 is transmitted to each input port Si1~SiM of the optical switch 470 for λ1 via the wideband pass filter 480 that is connected to the second terminal 412 via each first terminal 411 of the M optical circulators 410, 420, 430, 440, 450 and 460.

Since the optical signal λ1 is in the operable range of the optical switch 470 for λ1, a λ1's path is diverted to desired output ports, the optical signal λ1 is transmitted to output ports So1~SoM of the optical switch 470. The transmitted optical signal λ1 is transmitted to the individual ports S1~SM of the M×M optical switching block 351 connected to the first terminal via the third terminals (e.g., 413) of optical circulators connected to output ports So1~SoM of the optical switch 470 and the signal is then transmitted to the individual ports 312, 322 and 332 of 2×N multiplexers/demultiplexers 310, 320 and 330 via the C2 coupler 342, the CN+2 coupler 344 and the C(M/2−1)N+2 coupler 346. The optical signal λ1 transmitted to the individual ports is wavelength-division-multiplexed. The wavelength-division-multiplexed optical signal λ1 is then transmitted to the third terminals 02, 04 and 0M via the second terminals of the optical circulators 302, 304 and 306 connected to the multiplexing ports of the 2×N multiplexers/demultiplexers 310, 320 and 330.

In the above manner, the M×M optical cross-connect system according to one embodiment of the present invention divides M N-wavelength division-multiplexed optical signals according to its individual wavelengths, and connects the divided optical signals to an optical switching block of a corresponding wavelength, in such a way that it can divert a signal path toward a desired part and transmit the signals to the desired part.

As apparent from the above description, in the case of an M×M optical cross-connect system for handing M input optical fibers and M output optical fibers, M/2 2×N-AWGs are needed whereas 2M 1×N-AWGs are needed in the conventional prior art systems. In this manner, the optical cross-connect systems according to the present invention has a simple configuration and low production costs by minimizing the number of requisite components. As a result, the embodiments of the present invention can implement new network node configurations for effectively and economically managing the ever increasing channel capacity demands of optical communication networks.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical cross-connect system including M (where M is an even number ≧2) input terminals receiving wavelength-division-multiplexed optical signals and M output terminals receiving wavelength-division-multiplexed optical signals, the optical cross-connect system comprising:

a plurality of wavelength division multiplexers/demultiplexers each having two one-side ports and N (where N is an integer >0) other-side ports, performing wavelength division multiplexing/demultiplexing functions;

a plurality of optical circulators each connected to one-side port of the wavelength division multiplexers/demultiplexers, respectively, for outputting wavelength-division-multiplexed optical signals received via the input terminals to one-side ports of the wavelength division multiplexers/demultiplexers, for receiving wavelength-division-multiplexed optical signals from one-side ports of the wavelength division multiplexers/demultiplexers, and for outputting the wavelength-division-multiplexed optical signals to the output terminals;

a plurality of optical couplers each connected to the N other ports of the wavelength division multiplexers/demultiplexers, respectively, for branching optical signals of individual wavelengths being wavelength-division-demultiplexed, the optical signals being received from the wavelength division multiplexers/demultiplexers; and N optical switching blocks for N wavelengths, for receiving the optical signals branched from the optical couplers according to their wavelengths, switching the optical signals to a desired path, and transmitting the switched optical signals to the desired path, wherein one of the optical signals branched from the optical coupler is input to the optical switching block having a corresponding wavelength and distributed to a desired output terminal, and the other one of the optical signals is input to an optical switching block being out of an operable wavelength range and filtered by the optical switching block.

2. The optical cross-connect system according to claim 1, wherein the N optical switching blocks for N wavelengths respectively include:

an optical switch having an M×M matrix structure; and a plurality of optical circulators each connected to M input terminals and M output terminals of the optical switch, for transmitting I/O (Input/Output) bidirectional signals to the optical switch.

3. The optical cross-connect system as set forth in claim 2, wherein the N optical switching blocks for N wavelengths respectively further include:

a plurality of wideband pass filters for reducing noise in the optical signals received at the M input terminals of the optical switch via the optical circulators.

4. The optical cross-connect system according to claim 1, wherein the number M of input or output terminals is 2.

5. The optical cross-connect system according to claim 4, wherein the optical switching blocks are respectively arranged between branched ports of the N couplers, and respectively transmit two optical signals of individual wavelengths, received from individual ports of interconnected wavelength division multiplexers/demultiplexers, in a signal traveling direction or transmit the two signals in the opposite direction of a traveling direction of each optical signal.

6. The optical cross-connect system according to claim 5, wherein the optical switching blocks each include:

one pair of wideband pass filters connected to each branched port of the N couplers, for passing optical signals having individual wavelengths; and an optical mirror arranged between the one pair of wideband pass filters, for passing two signals of individual wavelengths in a signal traveling direction or reflecting the two signals in the opposite direction of each signal traveling direction.

7. The optical cross-connect system according to claim 5, wherein the optical switching blocks are respectively configured as a Bragg grating, which is positioned between branched ports of the N couplers and reflects optical signals having a corresponding wavelength.

* * * * *